Figure 1:
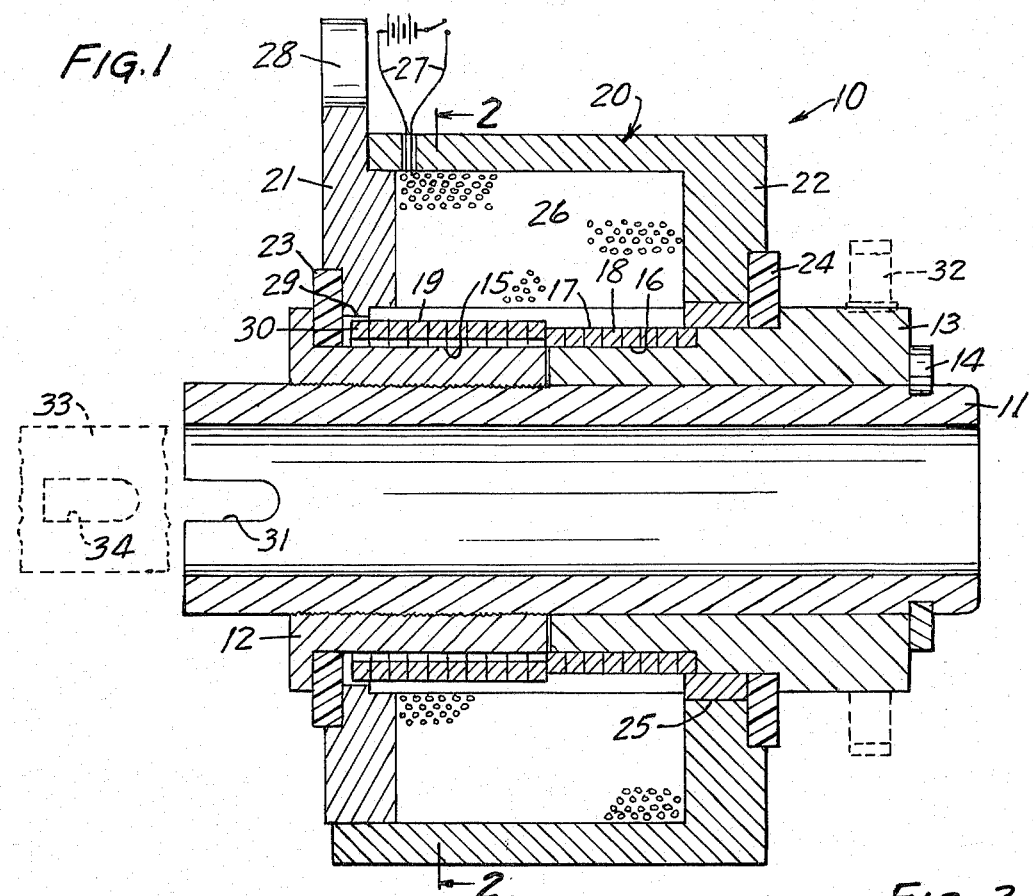

United States Patent [19]
Wahlstedt et al.

[11] 3,974,902
[45] Aug. 17, 1976

[54] MAGNETIC SPRING GRIP DEVICE

[75] Inventors: Robert L. Wahlstedt, Roseville;
Robert F. Rasmussen, Minneapolis;
Lee W. Johnson, Lake Elmo, all of Minn.

[73] Assignee: Reel Precision Maufacturing Corporation, St. Paul, Mich.

[22] Filed: June 26, 1975

[21] Appl. No.: 590,401

Related U.S. Application Data

[63] Continuation-in-part of Ser. No. 531,250, Dec. 9, 1974, abandoned.

[52] U.S. Cl. .......................... 192/84 T; 192/81 C
[51] Int. Cl.² ........................................ F16D 27/10
[58] Field of Search ...................... 192/84 T, 81 C

[56] References Cited
UNITED STATES PATENTS

| | | | |
|---|---|---|---|
| 3,216,392 | 11/1965 | Shimanckas | 192/84 T X |
| 3,315,773 | 4/1967 | Aschauer | 192/84 T X |
| 3,349,880 | 10/1967 | Baer | 192/84 T |

*Primary Examiner*—Allan D. Herrmann

[57] ABSTRACT

An electromagnetically actuated clutch or the like having a helical spring disposed about the surface of a relatively rotatable drum, and an electromagnet with a fixed annular pole piece closely adjacent the free end coil of the spring. The spring is induced to grip the drum surface by the action of magnetic flux passing from the drum to the spring and thence directly to the polepiece.

8 Claims, 3 Drawing Figures

U.S. Patent  Aug. 17, 1976  3,974,902

MAGNETIC SPRING GRIP DEVICE

This application is a continuation-in-part of our co-pending application Ser. No. 531,250 filed Dec. 9, 1974 and now abandoned.

This invention relates to electrically operated helical spring grip devices such for example as clutches.

Helical spring clutches ordinarily comprise a helical spring coiled loosely about a coaxially disposed drum or hub, the two being relatively rotatable. Slight contraction of the spring produces a gripping action on the drum and prevents further relative rotation. Alternatively, the spring may be biased toward gripping contact, and released by slight expansion of the spring.

The last-named action is achieved in the clutch of U.S. Pat. No. 3,726,372 by means of a sleeve loosely surrounding the spring and making contact with its outturned free end. Slight rotation of the sleeve relative to the spring and in a direction to cause expansion of the spring releases the gripping action and permits relative rotation of spring and drum. The action of the sleeve may be variously controlled. U.S. Pat. No. 3,349,880 employs an electromagnet to indirectly restrain the sleeve, cause relative rotation of sleeve and spring, and thereby release the gripping action of the spring on the drum.

Electromagnetically inducing contraction of a helical clutch spring is described in U.S. Pat. No. 3,685,622. In this patent the flattened free end turn of the spring is drawn magnetically toward a reluctance gap in a radial extension of the relatively rotatable hub, causing the spring to wrap down on the hub in the desired gripping action.

Figure 2:
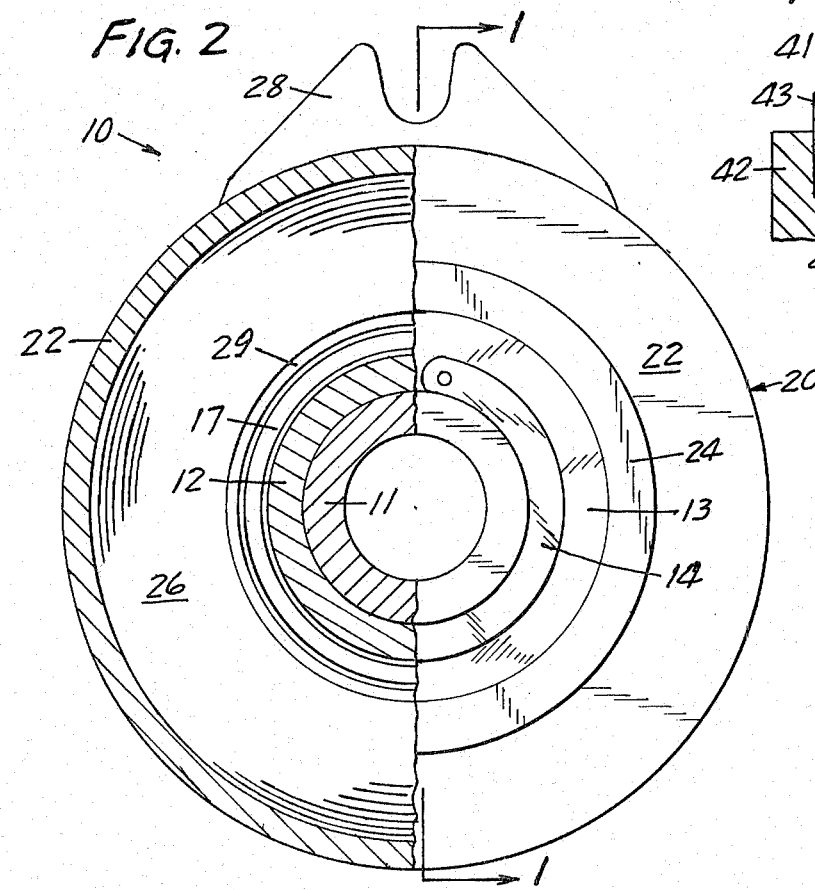
Figure 3:
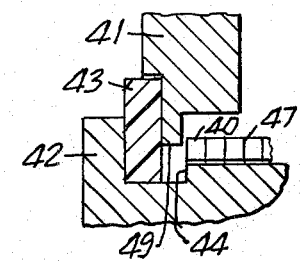

The device of the present invention requires neither a control sleeve nor a gapped radial hub extension. Instead, the free end of the spring surrounding the relatively rotating drum is caused to wrap down on the drum under the influence of magnetic lines of flux passing through the drum to the spring and thence directly to a stationary pole piece, employing a greatly simplified construction as will now be further described in connection with the accompanying illustrative drawing, wherein:

FIG. 1 is a view in longitudinal axial cross-section taken along line 1—1 of the device of FIG. 2, FIG. 2 is an end elevation having a portion in section along line 2—2 of FIG. 1, and FIG. 3 is a detail view showing a portion of an alternative structure.

The clutch 10 of FIGS. 1 and 2 is comprised of a tubular shaft 11 carrying a fixed drum 12 and a rotatable drum 13, the latter being held in place by a spring clip 14. The adjacent inner portions 15 and 16 of drums 12 and 13 have the same external diameter. A helical spring 17 has a smaller diameter portion 18 fitting tightly about the portion 16 of rotatable drum 13 and a larger diameter portion 19 suspended loosely about the portion 15 of fixed drum 12.

A housing 20 surrounds the spring 17. It comprises an annular pole piece 21 and a cup-shaped main piece 22, supported on the drums 12 and 13 by anti-friction end bushings 23, 24 and bearing 25. The housing contains a winding 26 with leads 27 for connection to a source of electricity as indicated and serves as a selectively actuatable magnetic flux generating means. The pole piece 21 has an extension 28 for securing the housing, and an annular ridge or extension 29 around the inner circumference overlying the free end turn 30 of the spring 17.

The shaft, drums, spring, housing and bearing are of ferromagnetic material. When current is supplied to the winding, the magnetic flux generated passes from the housing through the bearing 25, rum 13, shaft 11, drum 12, spring 17, and thence directly to the pole piece 21. The free end of the spring is thereby attracted into contact with one or both of the drum 12 or pole piece 21, causing the spring to wrap down and grip the surface of the relatively rotatable drum 12.

In use as a clutch, the device is mounted on an axle 33, indicated here in phantom, inserted within the tube 11 and carrying a key 34 fitting the keyway 31. A shaft of steel or other ferromagnetic material will ordinarily serve as an axle and is preferred as providing for increased concentration of magnetic flux. A sprocket or pulley 32, also shown in phantom, is keyed to the outer end portion of the drum 13 and connected, as by gear train, chain or belt, to a source of power. Input drum 13 rotates freely until current is supplied to the coil 26, whereupon the spring 17 engages the output drum 12 as noted above and drives the axle and apparatus attached thereto. With current disconnected, the spring expands out of contact with the drum 12 and torque is no longer transmitted. Extremely rapid and positive engagement and disengagement are achieved.

In a specific illustrative but non-limiting example the drum portions 15 ad 16 have a diameter of 0.501 inch. The spring is made of hard drawn steel music wire of square cross-section measuring 0.030 inch on a side and consists of eight turns fitting snugly over the drum 13 and ten turns formed to an inside diameter of 0.508 inch and disposed around the drum 12. The inner ridge extension 29 of the annular pole piece 21 has an inside diameter of 0.576 inch. Thus the normal clearance between pole piece and spring is 0.004 inch, and between spring and drum 12 is 0.0035 inch. With a spring of these materials and dimensions, a magnet winding of 1800 turns of No. 35 enameled copper wire and having a resistance of 120 ohms provides effective actuation of the clutch.

The bushings 23 and 24 are of "Teflon" or "Delryn" polymer, whereas the bearing 25, as also the drums 12 and 13, pole piece 21, and housing 22 are of pressed sintered powdered ferrous metal alloy. The drum 12 is fixed onto the shaft 11 in a press fit. Drum 13 contains a lubricant and rotates freely about the shaft 11. Bearing 25 likewise is lubricated and rotates freely about drum 13; or the casing 20 may alternatively be lubricated and in direct rotative contact with the drum.

FIG. 3 illustrates a minor variation in which the inner annular extension 49 of the pole piece 41 is adjacent the end face rather than the outer periphery of the free end coil 40 of spring 47. The drum 42 is peripherally recessed at 44 in line with the free end of the spring, and beneath the extension 49, the bushing 43 then fitting into the recess as shown. In this modification the spacing between the extension 49 and the drum 42 is much greater than the sum of the spacings between the spring 47 and the pole piece 41 and drum 42. The path of magnetic flux remains the same, i.e. from drum to spring and thence directly to the pole piece.

Various additional modifications of structure are possible. For example, the helical spring may be of constant diameter, the portion 15 of drum 12 then being appropriately smaller in diameter than the closely adjacent portion 16 of drum 13. A fixed support may be substituted for the drum 13 and the drum 12 subjected to rotation, in which event the device acts as a stop or brake. Torque may be applied through shaft 11 and drum 12, and transmitted from drum 13. The device may be made to operate in either direction of rotation by using a spring coiled in the proper direction to insure its tightening or winding up on the drum 12 upon actuation.

What is claimed is as follows:

1. A magnetic spring grip device comprising a drum or hub, a helical spring loosely engageably coiled about said drum and having a free end coil, said drum and spring being relatively rotatable, and an annular pole piece, fixed with respect to said drum and spring, closely adjacent said free end coil and defining, with said drum and coil, a magnetic path wherein magnetic lines of flux pass from said drum to said coil and directly to said pole piece; and a selectively actuable generating means for generating said lines of flux.

2. Device of claim 1 wherein said spring is supported on a second drum closely coaxially disposed with respect to the first drum.

3. Device of claim 2 wherein said second drum is rotatably supported on a tubular shaft to which said first drum is fixedly attached.

4. Device of claim 3 wherein said flux generating means comprises a housing, including said pole piece, encircling said spring and rotatably supported about said drums.

5. Device of claim 4 wherein said pole piece includes an inner annular extension closely overlying said free end coil.

6. Device of claim 4 wherein said pole piece includes an inner annular extension closely adjacent the free end face of said spring and said first drum is of reduced diameter beneath said extension.

7. Device of claim 4 wherein said housing is supported on said first drum by an intervening polymeric anti-friction bushing and on said second drum by a ferromagnetic bearing and a polymeric anti-friction bushing.

8. Device of claim 7 wherein is included a ferromagnetic axle disposed within and keyed to said tubular shaft, and a sprocket keyed to said second drum.

* * * * *

UNITED STATES PATENT OFFICE
CERTIFICATE OF CORRECTION

Patent No. 3,974,902   Dated August 17, 1976

Inventor(s) Robert L. Wahlstedt et al.

It is certified that error appears in the above-identified patent and that said Letters Patent are hereby corrected as shown below:

On the Title Pate, Item [73] should read

--- Reell Precision Manufacturing Corporation ---.

Column 2, line 6, "rum" should read --- drum ---.

Column 2, line 29, "ad" should read --- and ---.

Signed and Sealed this

Twelfth Day of October 1976

[SEAL]

Attest:

RUTH C. MASON
*Attesting Officer*

C. MARSHALL DANN
*Commissioner of Patents and Trademarks*